United States Patent [19]

Hasegawa

[11] Patent Number: 4,641,363

[45] Date of Patent: Feb. 3, 1987

[54] COMMUNITY ANTENNA TELEVISION COMMUNICATION SYSTEM

[75] Inventor: Yonosuke Hasegawa, Tokyo, Japan

[73] Assignee: Pioneer Electronic Corporation, Tokyo, Japan

[21] Appl. No.: 777,809

[22] Filed: Sep. 19, 1985

[30] Foreign Application Priority Data

Sept. 19, 1984 [JP] Japan .................. 59-197628

[51] Int. Cl.$^4$ ............................... H04N 7/18
[52] U.S. Cl. ........................... 455/4; 455/5; 364/513; 358/86
[58] Field of Search .................. 358/86, 114–124; 455/2, 3, 4, 5, 6, 26, 31, 34, 38; 364/513

[56] References Cited

U.S. PATENT DOCUMENTS 4,439,784   3/1984   Furukawa et al. .................. 455/4

Primary Examiner—Russell E. Adams
Attorney, Agent, or Firm—Sughrue, Mion, Zinn, Macpeak & Seas

[57] ABSTRACT

A CATV communication system in which a distribution unit performs the functions of channel tuning and response to polling for plural associated terminal units. The distribution unit includes a main central processing unit for performing data communication between the center and the distribution unit, at least one subsidiary central processing unit and a plurality of terminals associated therewith, and a switching unit for selectively connecting the buses of the respective processing units to buses of a ROM and RAM having sharable addresses with the condition that the main central processing unit has priority.

3 Claims, 5 Drawing Figures

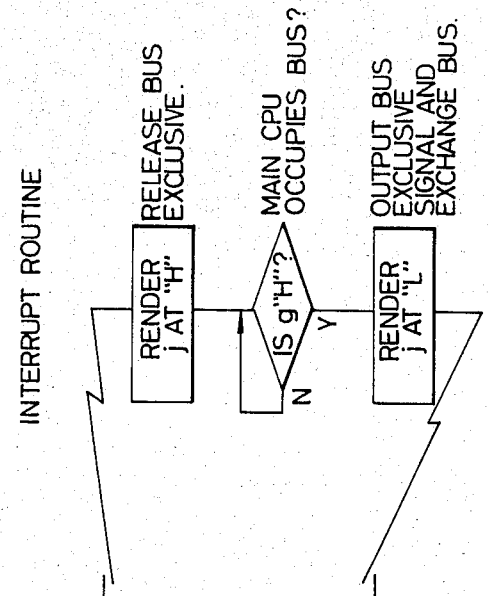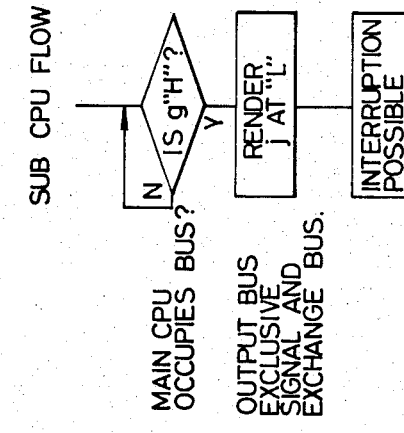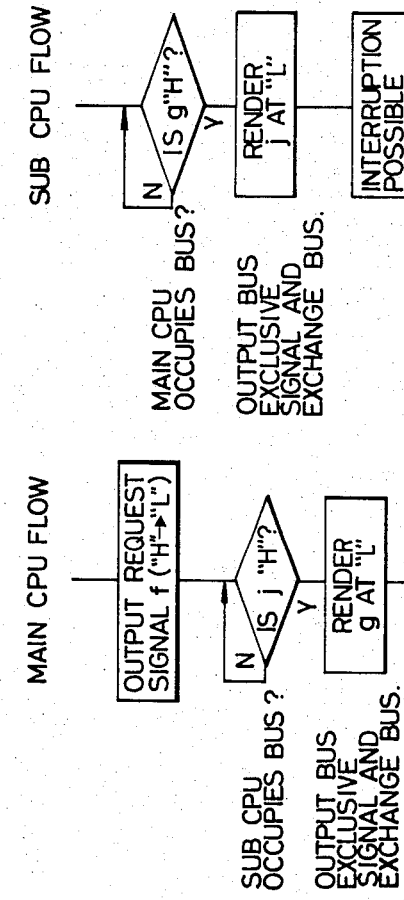

COMMUNITY ANTENNA TELEVISION COMMUNICATION SYSTEM

BACKGROUND OF THE INVENTION

The present invention relates to a community antenna television (CATV) communication system in which a distribution unit is interposed between a center and each subscriber's terminal so that channel selecting control for the terminal is performed in the distribution unit.

FIG. 1 shows a conventional communication system, in which a TV signal transmitted to a transmission system 4 from a head end 1 at a center side through a trunk amplifier 2 and a distribution amplifier 3 is distributed to respective transmission lines 115 for corresponding terminals 500 through distributors 117 and 118. In each terminal 500, a data signal superimposed on the TV signal is separated from the latter through a filter 501, and the TV signal is transferred to a descrambler 505 through a converter 504 so as to be descrambled thereat, and is then transferred to a TV receiver 600. On the other hand, the data signal is demodulated by a demodulator 502 and supplied to a controller 506. Upon reception of a channel selection signal selected by the key operation of a remote controller 508, the controller 506 judges whether the channel is permitted to be received or not, drives a PLL circuit 503 to perform electronic control of tuning of the converter 504, and causes the descrambler 505 to operate.

The terminal 500 has, as described above, the converter 504, the controller 506 for controlling the converter 504 through the PLL circuit 503, and the descrambler 505, thereby performing data communication function on the center side, PLL control, remote input control, selected channel indication, descrambler control etc.

In this system, a problem arises in that many functions and high responses in order to respond to the polling from the center side are required for a controller in every terminal. Therefore, the cost of each terminal is considerably expensive. Further there is a disadvantage that the terminals must be given individual addresses because polling is performed between the center and each terminal, and thus the time taken for polling becomes longer as the number of the terminals increases. Moreover, there is a further problem in that wire tapping reception may be easily performed by copying the design of any terminal.

Therefore, there has been proposed a distribution unit system in which channel-selection control for the terminals is concentratedly performed at a distribution portion.

SUMMARY OF THE INVENTION

It is therefore an object of the present invention is to eliminate the above-mentioned defects in the prior art.

It is another object of the present invention to provide a CATV communication system in which necessary components are incorporated in a distribution unit for performing distribution for terminals so that the construction of each terminal is simplified and concentrated control is performed in the distribution unit, with the result that the cost of the system can be reduced, wiretapping prevented, and the polling efficiency improved by allowing asynchronicity between polling data and random data transmitted from a respective terminal.

In order to attain the foregoing objects, according to the present invention, a CATV communication system is provided in which a distribution unit is interposed between a center and the terminals so that channel selecting control for the terminals is performed in the distribution unit, the distribution unit being provided with a main central processing unit for performing data communication between the center and the distribution unit, at least one subsidiary central processing unit for performing data communication between the distribution unit and a plurality of terminals associated therewith, and a switching unit for selectively connecting buses of the respective processing units to buses of ROM and a RAM having sharable addresses so that the data communication is performed under the condition that the main central processing unit is provided with priority.

These and other objects and advantages of the invention will become apparent from the following description of the preferred embodiment taken in conjunction with the accompanying drawings.

BRIEF DESCRIPTION OF THE DRAWINGS

FIG. 5 is a flowchart used for explaining access to a shared memory of main- and sub-central processing units.

DESCRIPTION OF THE PREFERRED EMBODIMENTS

Figure 1:
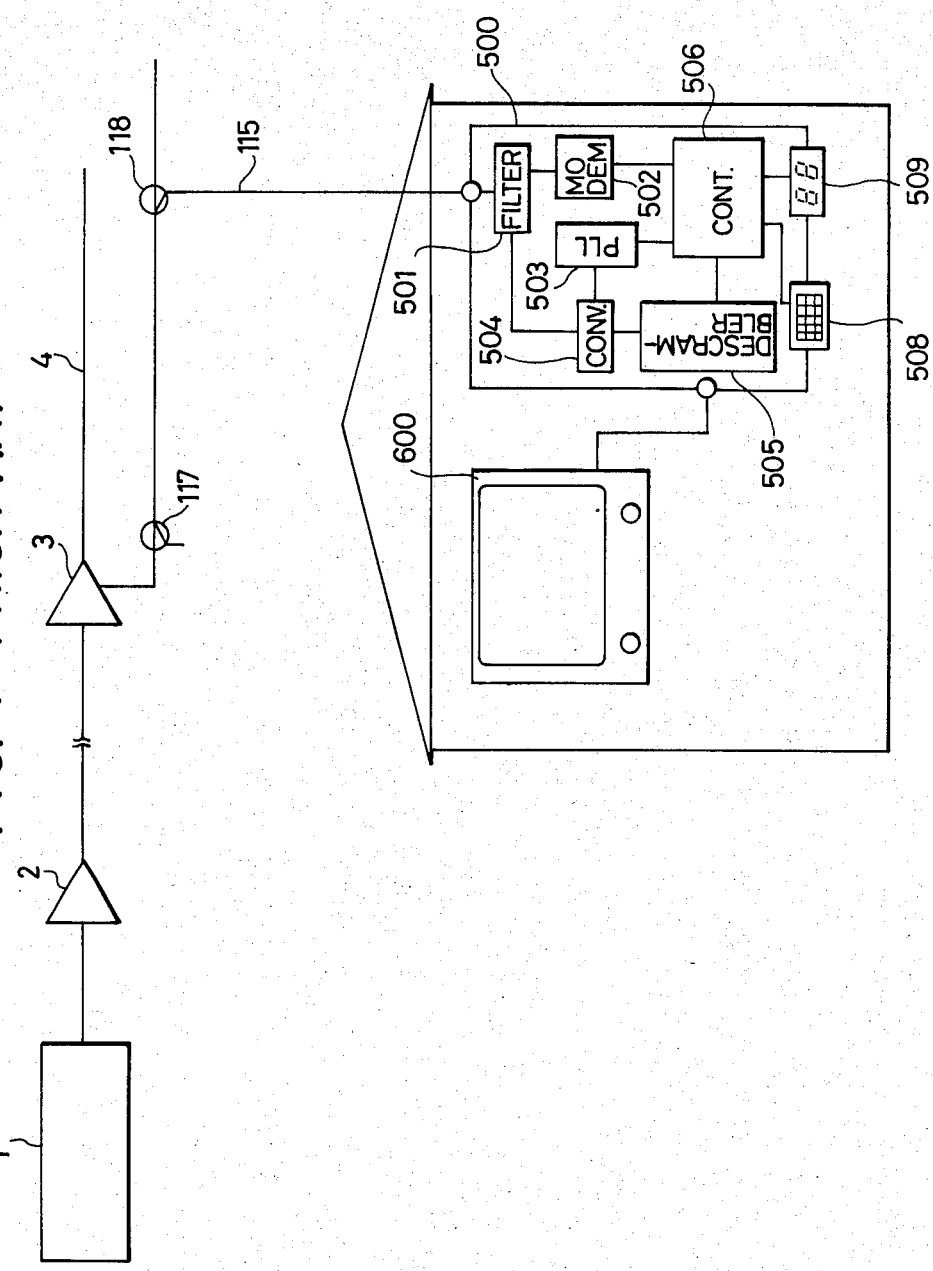
FIG. 1 is a schematic diagram of a conventional CATV communication system.
Figure 2:
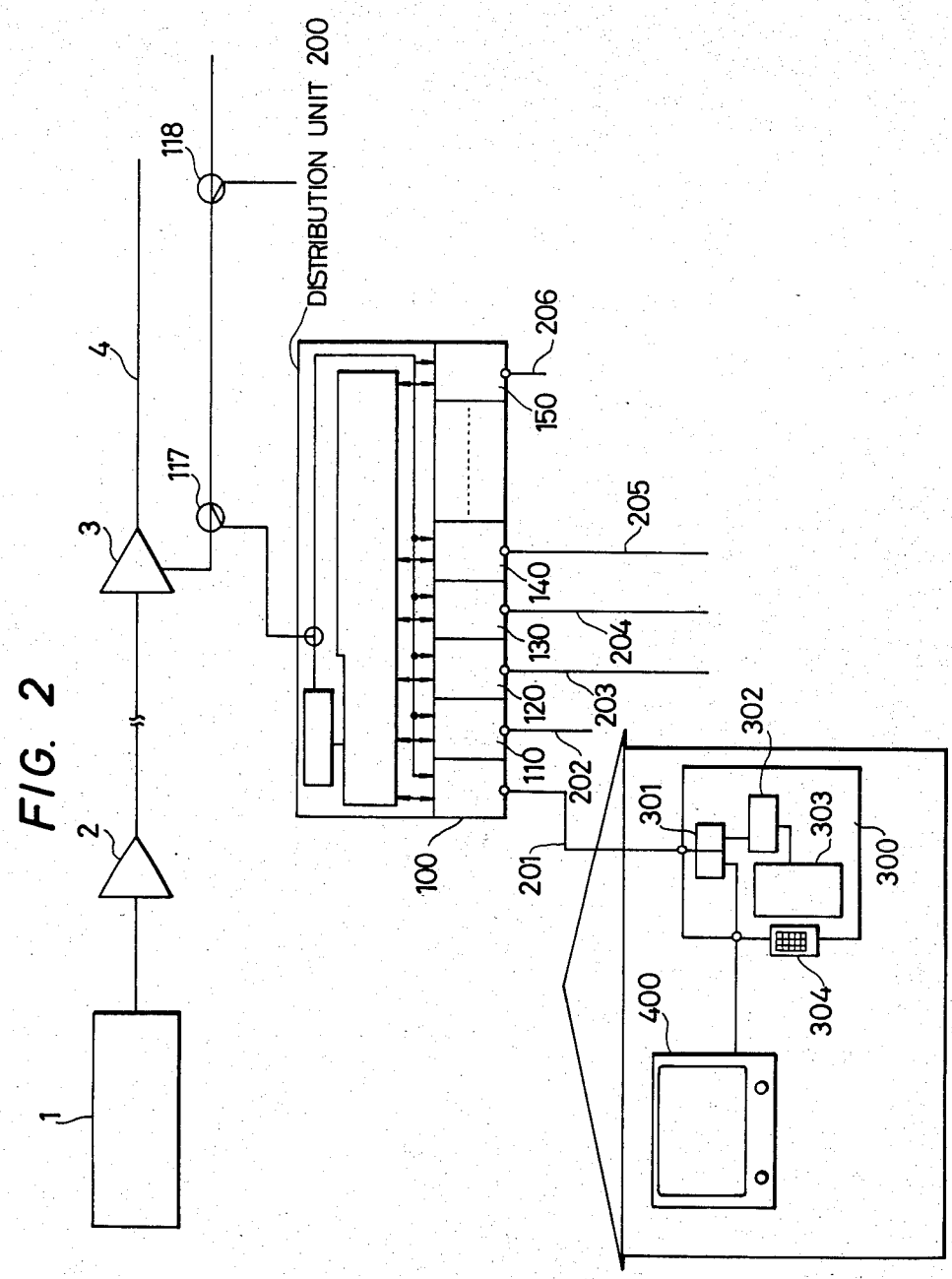
FIG. 2 is a schematic diagram of a preferred embodiment of a CATV communication system according to the present invention.

Referring to FIGS. 2 to 5, a signal transmitted from a head end 1 of a center to a transmission system 4 through a trunk amplifier 2 and a distribution amplifier 3 is supplied to a distribution unit 200 through a distributor 117. The distribution unit 200 is connected to terminals 300 through lines 201, 202, 203, etc., so that data communication can be performed therebetween. Also, a TV signal is supplied to each terminal 300 through the above-mentioned line and applied to a TV receiver 400 through a branching filter 301. An upward signal from a remote controller 304 is processed by a controller 303, sent out to the line 201 through a modulator 302, and transferred to the distribution unit 200.

Figure 3:
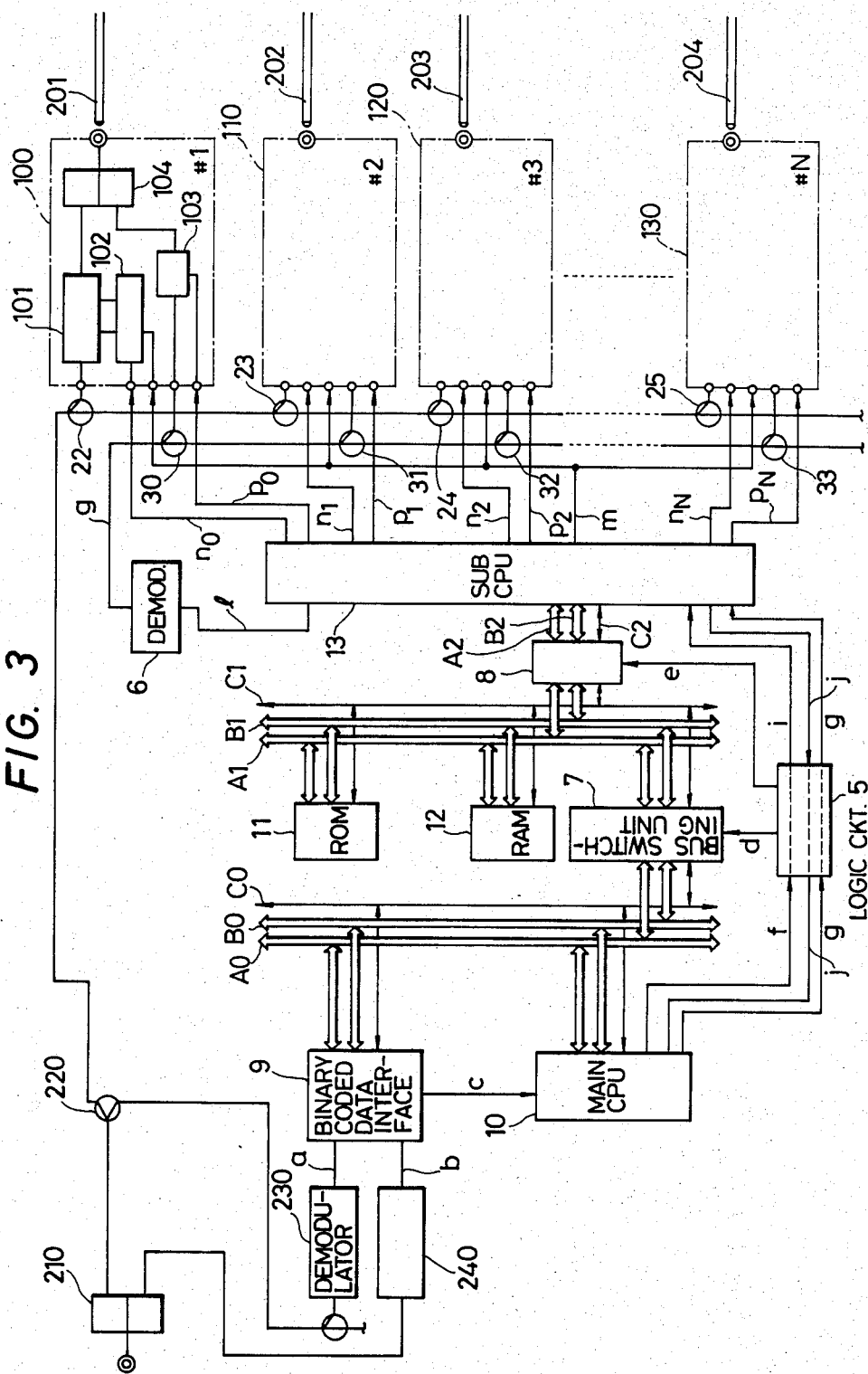
FIG. 3 is a block diagram of a distribution unit used in the system of FIG. 1.

The distribution unit 200 is arranged in the manner shown in FIG. 3. That is, an input signal from the distributor 117 enters a branching filter 220 through a splitter 210. The TV signal is separated out by the branching filter 220 and distributed to channel selection signal transceivers 100 to 130 through distributors 22 to 25, respectively. The respective TV signal is tuned by each converter 101 and transferred to corresponding ones of the lines 201, 202, etc., through each branching filter 104. Upward signals from the respective lines 201, 202, etc., enter the corresponding channel selection signal transceivers 100 to 130, enter corresponding distributors 30 to 33 through respective switches 103, and are supplied to respective demodulators 6.

A downward data signal branched by the branching filter 220 is transferred to a data communication interface (DCI) 9 through a demodulator 230 and there subjected to serial-parallel conversion of binary coded data, thereby supplying an address signal, a data signal, and a control signal to buses $A_0$, $B_0$, and $C_0$ respectively. These signals are processed by a main central processing unit 10, and transmitted to buses $A_1$, $B_1$, and $C_1$, respectively, through a bus switching circuit 7 so that the downward data signal is written in a RAM 12. Reversely, in the case where upward data is to be transmitted in response to polling from the center side, the data is read out of the RAM 12, supplied to the modulator 240 through the DCI 9, and after being modulated, is transferred to the branching filter 210.

On the other hand, the bus switching circuit 7, together with another bus switching circuit 8, is subject to switching control by a logic circuit 5 so that the bus switching circuit 8 connects buses $A_2$, $B_2$, and $C_2$ of a sub-central processing unit 13 to the buses $A_1$, $B_1$, and $C_1$, respectively. While the bus switching circuit 8 is closed, the information in the RAM 12 is read out so that the switch 103 in one of the channel selection signal transceivers 100 to 130 corresponding to the terminal to be required polling on the basis of the read-out information is turned on, and the upward data is processed by the demodulator 6 and written into the RAM 12 having the shared addresses. At the same time, a PLL circuit 102 is supplied with a control signal to perform tuning of the converter 101. If necessary, the converter 101 may include a descrambler.

Figure 4:
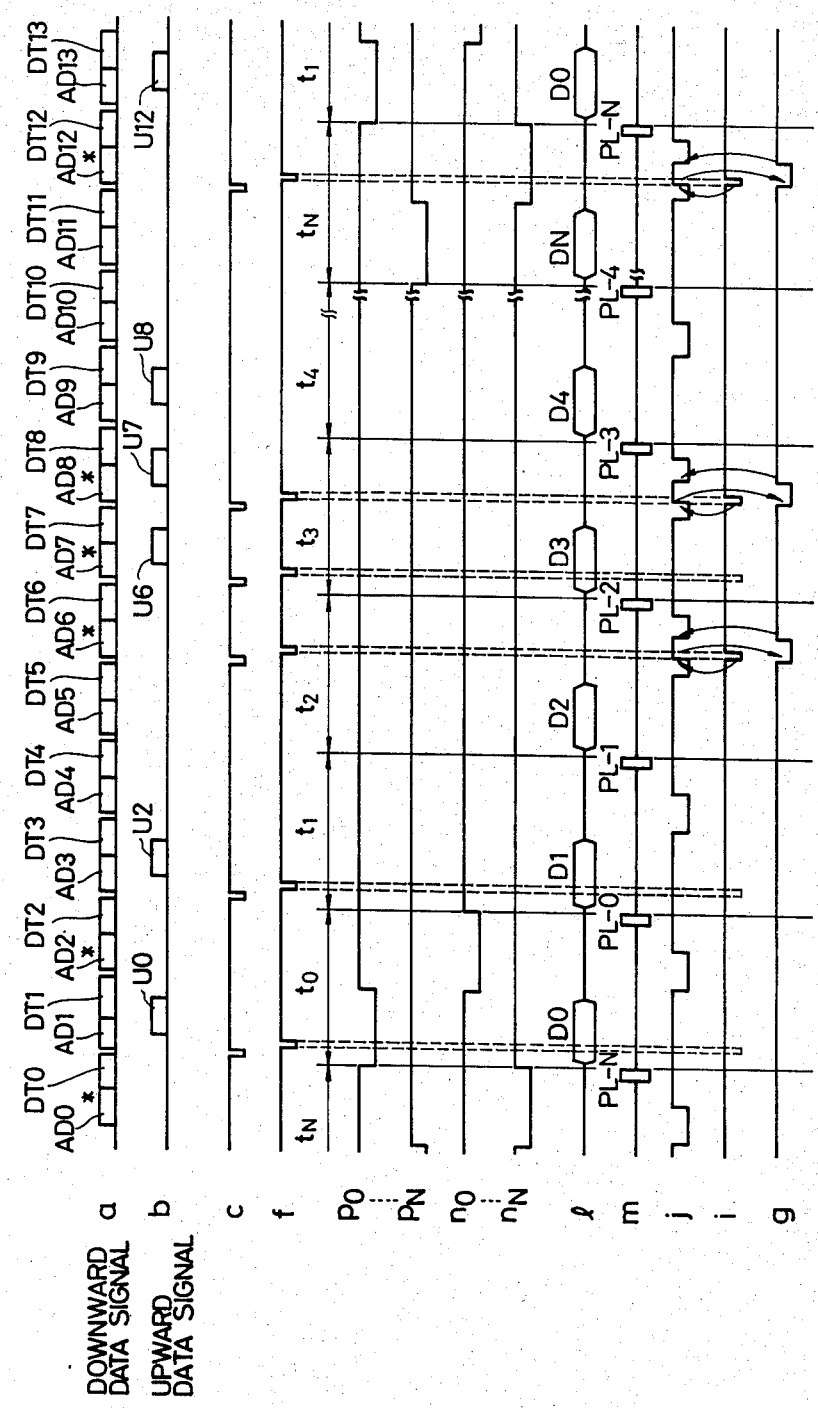
FIG. 4 is a timing chart used in describing the operation of the system of FIG. 1.

Next, referring to FIG. 4, the operation of the data signal will be described in detail. In the drawing, a downward binary coded serial data signal a, constituting one polling data value, includes address data portions $AD_0$ to $AD_{13}$ and data portions $DT_0$ to $DT_{13}$. The sign "*" represents that the distribution unit shown in the drawing has addresses $AD_0$, $AD_3$, $AD_6$, $AD_7$, $AD_8$, and $AD_{12}$ as private or individual addresses with respect to respective subscribers. The reference symbol c designates a signal indicating "request to receive" to be transferred to the main central processing unit 10 from the DCI 9 upon address coincidence. Symbol f designates a request signal to command the buses $A_0$, $B_0$, and $C_0$ to be connected to the buses $A_1$, $B_1$, and $C_1$, (that is, the buses $A_2$, $B_2$, and $C_2$ are cut off) so that the main central processing unit 10 can be directly accessed by the ROM 11 and RAM 12, the signal f being transmitted to the sub-central processing unit 13 via the logic circuit 5. The signal f is stored in the RAM 12 as visual-aural control data for an associated subscriber in the RAM 12 after the "request to receiver" signal c has been received. The signal f is sent out as upward data in order to read out the visualaural status of the subscriber or the like from the RAM 12. A signal b is an upward data signal to be transmitted as upward data $U_0$, $U_3$, $U_6$, $U_7$, $U_8$, and $U_{12}$ in response to polling from the center side.

Symbols $t_0$, $t_1$, $t_2$, and $t_N$ designate the internal operating times of the sub-central processing unit 13, the respective times corresponding to the channel selection signal transceivers 100 to 130 (#1 to #N). Symbols $P_0$ to $P_N$ designate signals sent out from the subcentral processing unit 13, which indicate the timing of the data communication generation according to a polling system. Here, the period of low level L corresponds to a communication time allotted to the associated selection signal transmitter. The switch 103 is closed during the L-level period so that data communication can be performed. The reference symbol l designates communication data set to the respective signal transmitters.

Reference symbols $n_0$ to $n_N$ designate signals sent from the sub-central processing unit 13 in which the period of the L level indicates the validity time of the PLL data (shown as by $PL_1$ to $PL_N$ on the signal line m) to the respective signal transmitter. Control for the PLL circuits 102 is performed by ANDing the signal m with each of the respective signals $n_0$ to $n_N$.

The reference symbol i designates a signal that causes the "request to bus-switch" signal f of the maincentral processing unit 10 to be transmitted to the subcentral processing unit 13 through the logic circuit 5, the broken-line of the signal i showing the ANDing result between the signal i and a bus exclusive signal j of the sub-central processing unit 13. The result indicates the condition that the signal f is not supplied while the signal j is at the H (high) level, that is, while the subcentral processing unit 13 is not connected to the buses $A_1$, $B_1$, and $C_1$, and reversely, the signal f is supplied while the signal j is at the H level, that is, while the sub-central processing unit 13 is connected to the buses $A_1$, $B_1$, and $C_1$.

Generally, the bus request signal i is connected to an interrupt input terminal of the sub-central processing unit 13. Accordingly, the signal f may be supplied without passing through the logic circuit 5 if the interrupt enabled/disabled control function of the sub-central processing unit 13 is employed. That is, the function is such that the sub-central processing unit 13 is in the interrupt enabling state while the bus exclusive signal is at the L level, and reversely, the sub-central processing unit 13 is in the interrupt disabling state while the bus exclusive signal is at the H level.

The reference sysbol g designates the bus exclusive signal of the main central processing unit 10 for which for the L level the buses $A_1$, $B_1$, and $C_1$ are exlcusively used.

FIG. 5 shows the flow in the bus switching operation between the main- and sub-central processing units. The state of the bus switching will be described in detail hereunder with reference to the signals j, i, and g. Here, the buses $A_1$, $B_1$, and $C_1$ of the RAM 12 and ROM 11 are used mutually by the main- and sub-central processing units as needed during operation processing, and the interchange of communication information is made employing the shared memory space. Therefore, the use of the buses at the same time should be prohibited.

The procedure (A) of FIG. 5 shows the case where the main central processing unit 10 exclusively accesses the shared storage bus group. The priority in exclusive use is on the side of the main central processing unit 10. That is, the response to a communication in response to polling between the main central processing unit 10 and the center has higher priority, and accordingly, the memory access takes preference. When any one of the addresses corresponding to the terminals indicates polling, the main central processing unit 10 transmits the bus exclusive request signal j to read the status of each terminal for the purposes of command execution, saves the downward data, and transmits the upward data, and at the same time transmits its own exclusive signal g to access the shared memory in the case where the signal j is at the H level representing the non-exclusively used state of the buses $A_1$, $B_1$, and $C_1$ by the sub-central processing unit 13. In the case of an L level corresponding to the exclusive use by the sub-central processing unit 13, the main central processing unit transmits an interrupt request signal to the sub-central processing unit to require the latter to release the buses and waits for release. When the signal j changes from the H level to the L level and the buses are released, the main central processing unit starts access by setting the signal g to the L level.

The procedure (B) is for the case where the subcentral processing unit 10 exclusively uses the buses $A_1$, $B_1$, and $C_1$; and the procedure (C) is used when an interrupt processing routine in which the bus group is released by the sub-central processing unit in response to an interrupt from the main central processing unit 10 so as to be exclusively used by the latter. Although the procedure (B) is similar to the procedure (A), interrupt is enabled at the same time the sub-central processing unit exclusively uses the buses by changing the level of the exclusive-use signal j to the L level so that the exclusive-use request signal f from the main control processing unit 10 can be responded to. Moreover, after the exclusive use of the buses by the sub-central processing unit has been terminated, interrupt is inhibited so that other operations, such as communication or the like, cannot be disturbed.

The interrupt routine (C) is constituted such that the exclusive use of the buses by the sub-central processing unit 13 is released (the level of the signal j is changed from L to H), the release of exclusive use of the buses by the main central processing unit 10 is waited for (the level of the signal g is changed from L to H), and the exclusive-use signal j is transmitted once more.

Next, the bus switching circuits 7 and 8 will be described in detail. These circuits connect/disconnect selectively the respective buses $A_0$, $B_0$, $C_0$, and $A_2$, $B_2$, $C_2$ of the main- and sub-central processing units to/from the buses $A_1$, $B_1$, $C_1$ respectively. The circuits 7 and 8 perform an electrical opening/closing function and include an electrical high impedance state. The timing of the opening/closing function is such that the switching circuit 7 is closed at the same timing as the bus exclusive-use signal g of the main central processing unit 10, while the switching circuit 8 is closed at the same timing as the bus exclusive-use signal j of the sub-central processing unit 13. The logic circuit 5 sends out the bus exclusive-use signals g and j, the bus-request signal f, and the bus opening and closing signals d and e with the respective logical levels and polarities.

In the case where two or more sub-central processing units are provided, this logic circuit is arranged to have a further function of timing transmission for timely controlling the exclusive use of the shared memory for a plurality of bus groups of the sub-central processing units.

The upward data signal taken in the RAM 12 by the sub-central processing unit 13 includes not only the channel selection data but also visual-aural status information classified by subscribers and used as upward data for the purpose of answering the center side or the like in a bidirectional CATV system. The sub-central processing unit 13 controls the PLL circuit 102 corresponding to the terminals, reading the PLL control data therefor from the RAM 12, judging whether the channel is permitted to be viewed or not, and the like.

Although this data communication employs a polling system with respect to remote terminals using a half duplex transmission system, transmission and reception may be made during one of the periods $D_0$ to $D_N$, and further reception and transmission may be made during two successive periods, for example, during a certain period $D_i$ and during the next period $D_{i+1}$. Moreover, communication may performed by an apparent duplex transmission system between the sub-central processing unit 13 and the respective terminals in such a manner that the sub-central processing unit 13 receives a signal from the (i-1)th terminal while transmitting a signal to the (i-2)th terminal during a period $D_{i-1}$, receives a signal from the i-th terminal while transmitting a signal to the (i-1)th terminal during the next period $D_i$, etc., with respect to a plurality of subscribers.

In a CATV control system, the content of data communicated from the subscriber side is mainly channel forward end data and display data thereof, and, further, intervals for reading key operation data electrically or intervals for manually performing the key operation are generally from several tens of milliseconds to several hundred milliseconds in duration. Therefore, the action of channel selection can be substantially realized without difficulty as long as the polling cycle is from several tens of milliseconds to several hundred milliseconds.

The response to the polling of the center side arising at random asynchronously to the sub-central processing unit 13 makes it possible to request release of the buses with interrupt in the access time of the shared ROM and RAM. This little affects the polling of the terminal side.

Although the above-described embodiment relates to a case where the bidirectional data communication is effected, it can be applied to the case of one-way data communication in the same manner. In this case, however, the modulator 240 is not used. The demodulator 6 may be disposed in each of the channel selection signal transceivers 100 to 130. Although in this embodiment the lines 201, 202, etc., are electric signal transmission lines, it is a matter of course that the lines may be optical transmission lines as long as an electricity-to-light converter and a light-to-electricity converter are interposed between the distribution unit 200 and the respective terminal.

Although the above-described embodiment concerns the case where the bus switching circuits 7 and 8 perform switching actions with control signals, the same effect can be obtained if the bus groups $A_0$, $B_0$, $C_0$ and $A_2$, $B_2$, $C_2$ have a high impedance.

As described above, according to the present invention, the polling of the center side which is generally performd at a high speed is realized between the center and the distribution unit, and the control for the transmission of information and data for terminals and can be made effectively at a low speed and asynchronously with the polling by the use of the shared memory in the distribution unit. Moreover, the sub-central processing unit can control many terminals with a minimum number of control components (that is, hardware) by use of a polling system while making the best use of the characteristics of the information in the CATV terminals, resulting in the effect that hardward cost per terminal can be significantly reduced.

I claim:

1. A CATV communication system comprising: a plurality of subscribers' terminals, said subscribers' terminals being divided into groups, a center for producing television programs and for communicating bidirectionally with said subscribers' terminals, a plurality of distribution units, one of said distribution units being provided for each of said groups of subscribers' terminals, each of said distribution units being coupled between one of its group of subscribers' terminals and said center, each of said distribution units comprising a main central processing unit for performing bidirectional communications with said center, at least one subsidiary central processing unit for performing bidirectional communications with said subscribers' terminals, RAM and ROM memory means, address and data bus means coupled to said memory means, and switching means for controlling access to said bus means by said main central processing unit and said subsidiary processing unit with priority to said main central processing unit.

2. The CATV communications system of claim 1, wherein said distribution unit comprises means for tuning received television signals for each of said subscribers' terminals.

3. The CATV communications system of claim 1, wherein upward data to be transmitted to said center in response to polling from said center is stored in said RAM memory.

* * * * *